United States Patent
Su et al.

(10) Patent No.: US 8,309,632 B2
(45) Date of Patent: Nov. 13, 2012

(54) LIQUID CRYSTALLINE EPOXY NANOCOMPOSITE MATERIAL AND APPLICATION THEREOF

(75) Inventors: Wei-Fang Su, Taipei (TW); Sheng-Hao Hsu, Taipei (TW); Yun-Yuan Tai, Taipei (TW); Min-Huey Chen, Taipei (TW)

(73) Assignee: National Taiwan University, Taipei (TW)

( * ) Notice: Subject to any disclaimer, the term of this patent is extended or adjusted under 35 U.S.C. 154(b) by 276 days.

(21) Appl. No.: 12/656,632

(22) Filed: Feb. 5, 2010

(65) Prior Publication Data

US 2011/0009521 A1 Jan. 13, 2011

(30) Foreign Application Priority Data

Jul. 13, 2009 (TW) .............................. 98123563 A

(51) Int. Cl.
*C08L 63/00* (2006.01)
*A61K 6/08* (2006.01)

(52) U.S. Cl. ........ 523/428; 523/113; 523/115; 523/116; 523/118; 523/427; 523/440; 523/442; 523/443; 523/457; 523/458; 523/466

(58) Field of Classification Search ................... 427/2.1, 427/2.29; 523/105, 113, 115, 116, 117, 118, 523/440, 442, 443, 444, 457, 458, 466, 427, 523/428; 525/524

See application file for complete search history.

(56) References Cited

U.S. PATENT DOCUMENTS

| 6,362,251 B1 * | 3/2002 | Alkemper et al. ............. 523/116 |
| 6,667,360 B1 * | 12/2003 | Ng et al. ...................... 524/492 |
| 2004/0162364 A1 * | 8/2004 | Su et al. ........................ 523/115 |
| 2005/0059752 A1 * | 3/2005 | Frances ......................... 523/113 |

* cited by examiner

*Primary Examiner* — Michael J Feely
(74) *Attorney, Agent, or Firm* — Bacon & Thomas, PLLC

(57) ABSTRACT

The invention provides an epoxy nanocomposite material for dental therapy, which can be applied to direct or indirect clinical restoration, dental core-post system, and dental brace etc. The epoxy nanocomposite filling material provided by the invention can be polymerized with various curing agents to form the polymer with low shrinkage.

5 Claims, No Drawings

LIQUID CRYSTALLINE EPOXY NANOCOMPOSITE MATERIAL AND APPLICATION THEREOF

BACKGROUND OF THE INVENTION

1. Field of the Invention

The invention relates to a liquid crystalline epoxy nanocomposite material, particularly to a method for manufacturing a liquid crystalline epoxy nanocomposite material and application in dentistry.

2. Description of the Prior Art

At present, the nanocomposite material is gradually substituted the amalgam as the commercial filling material used in dental therapy, due to the operation is very convenient and the color is quite beautiful. However, the volume of nanocomposite material will be shrunk after being hardened. Thus, a tiny chink will be generated between the filling place and the interface of tooth. The fluid, food residue or microorganism may accumulate in the oral cavity to form the dental caries again or to destroy the filling material.

In addition, it is usually necessary to make the artificial crown for the tooth after the root canal therapy, to prevent the rupture of tooth upon chewing, and lengthen the tooth life after the root canal therapy. However, upon making the crown, a certain amount of tooth itself is required to fix the crown. If the residual amount of tooth is not enough for fixing the crown, the core-post system has to be made first, in order to make the artificial crown further.

At present, when the alloy core-post system is applied to the front teeth area, the restoration of full ceramic crown with beautiful and natural demand will be limited, due to the color of metal is quite easy to show up. Moreover, the difference for the elastic coefficient of alloy and residual tooth is very large, the difference of stress and strain will also be very large, the failure of adhesive, rupture of post, and rupture of root are often occurred.

In addition, accompanying with the social progress and development, the people gradually increase their own beauty demand, and the orthodontic treatment becomes a prevailing matter. It not only improves people's beauty, but also let the men and women with "too shy to show their teeth" regaining the beautiful smile again. It promotes the psychological and social function, and also can solve the poor hygiene problem of mouth due to chewing disorder and crowded teeth.

At present, the stainless steel brace is usually used clinically. Except containing a small amount of nickel metal that may cause the allergy of mouth tissue, its gloss and shape is also very clumsy, so that some adult patients are unable to accept it, and they are unwilling to accept the orthodontic treatment.

In recent years, though the cosmetic braces of various types of materials have already been put out successively, some problems are still unable to be overcome. For example, the porcelain brace has already been able to meet the beautiful demand, but its hard and fragile property is apt to cause the wear of teeth and break the brace during diagnosing the patient by the doctor.

Furthermore, if the porcelain brace is broken, it must be replaced by new brace to finish the treatment continuously, which will cause the extreme inconvenience. The polycarbonate brace is often used as the cosmetic brace at present, because it is lighter and thinner and the patient can feel more comfortable. However, the shear bonding strength (SBS) of the polycarbonate brace is lower than that of metal brace. It is even unable to satisfy the actual strength of clinical demand. The compatibility is insufficient between its material and the adhesive. The wear resistance for the mesh-like retention structure of its base is not as good as the metal brace. If the thin metal sheet has not installed in the groove of orthodontic thread, the groove is apt to deform when the orthodontic thread is tied and the force is applied. The result is that the axial direction and position of teeth alignment is unable to be controlled well, so that the orthodontic treatment will be failed. But the installation of the thin metal sheet will influence the aesthetics. The reinforced resin material is the new material introduced for the make of dental brace.

In recent years, the research and development has been conducted by several teams in American and European countries. However, it only focuses on improving the filler ingredient or specific gravity of the traditional resin at the present stage. There is no dental brace made by new type materials.

Therefore, in order to solve the poor physical property of the dental filling materials, and satisfy the special requirement of various dental applications, the invention provides an epoxy nanocomposite for solving the above-mentioned problems. The following is the brief description of the invention.

SUMMARY OF THE INVENTION

The invention provides an epoxy nanocomposite material for dental therapy, which can be applied to direct or indirect clinical restoration, dental core-post system, and dental brace etc. The epoxy nanocomposite filling material provided by the invention can polymerized with various curing agents to form the polymer with low shrinkage.

One of the purposes of the invention is to provide a method for manufacturing a liquid crystalline epoxy nanocomposite material comprises the following steps:

providing an inorganic oxide nanoparticle, wherein the inorganic oxide nanoparticle is modified by a silane coupling agent; mixing a liquid crystalline epoxy resin and a liquefied epoxy resin, and heating and dissolving it into an epoxy resin solution; mixing the epoxy resin solution, the inorganic oxide nanoparticle and the curing agent; carrying out the polymerization to form a liquid crystalline epoxy nanocomposite with low shrinkage.

In a preferred embodiment, the inorganic oxide nanoparticle is even dispersed by a dispersant.

In another preferred embodiment, the chemical composition of the inorganic oxide nanoparticle is MOx, where M is an inorganic element or a mixture of inorganic element. And more preferably, the inorganic element comprises silicon, aluminum, titanium, gold, zinc and zirconium.

In another preferred embodiment, the general formula of the silane coupling agent is $(Y-R)_n SiX_m$, where n=1, 2 or 3, n+m≦4, and Y is the epoxy group, phenyl group or methyl group; R is linear alkyl group; and X is a group which can be hydrolyzed into Si—OH. And more preferably, the silane coupling agent is diphenyldimethoxysilane or γ-glycidoxypropyltrimethoxysilane (Z-6040).

In another embodiment, the dispersant is the surfactant or polymer dispersant.

In another embodiment, the mixture of epoxy resins include liquid crystalline epoxy resins, bis-phenol A epoxy resins, cycloaliphatic epoxies, or glycidyl ether. Table 1 is a list of liquid crystalline epoxy resins. And more preferably, the liquid crystalline epoxy resin is Biphenol epoxy [4,4'-bis(2,3-epoxypropoxy)biphenyl] or Azomethine epoxy [4,4'-bis(2,3-epoxypropoxy)-benzylidene aniline], or a mixture of them. The preferred cycloaliphatic epoxy resin is 3,4-epoxycyclohexanemethyl-3,4-epoxycyclohexane carboxylate (ERL-4221) or 4-vinyl cyclohexane dioxide (ERL-4206).

TABLE 1.1 list of liquid crystalline epoxy resins development since 1993

| Systems | Structure | Reference |
|---|---|---|
| Benzoate | (structure) | J. Jang, 1999 |
| | (structure) | B. M. Fung, 2000 |
| | (structure) | A. Serra, 2001 |
| | (structure) | M. Lu, 2006 |
| | (structure) | H. Galina, 2007 |
| Azomethine | (structure) | W-F Su, 1998 |
| | (structure) | E. J. Choi, 2000 |
| | (structure) | A. Serra, 2001 |
| | (structure) | A. Serra, 2002 |
| | (structure) | M. Harada, 2003 |
| | (structure) | M. Galia, 2003 |
| | (structure) | A. Serra, 2004 |

TABLE 1.1-continued list of liquid crystalline epoxy resins development since 1993

| Systems | Structure | Reference |
|---|---|---|
| | 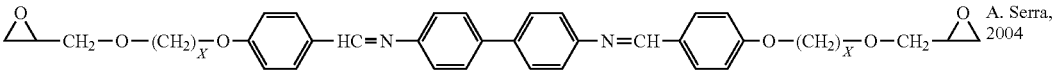 | A. Serra, 2004 |
| | 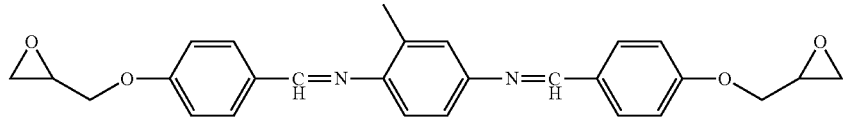 | S. Li, 2007 |
| | 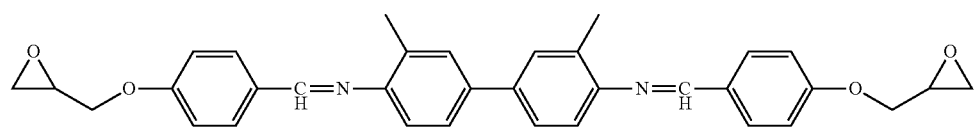 | S. Li, 2007 |
| Others | 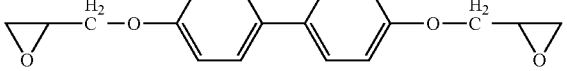 | W-F Su, 1993 |
| | 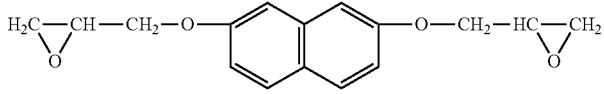 | C. N. Cascaval, 2005 |
| | 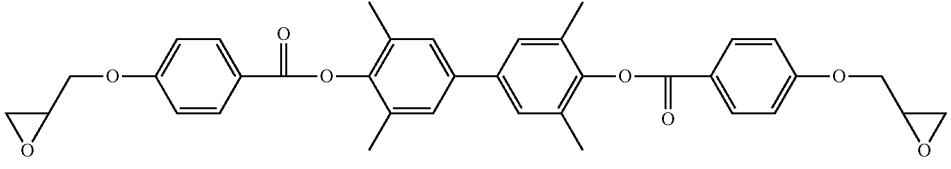 | J. Sun, 2007 |
| | 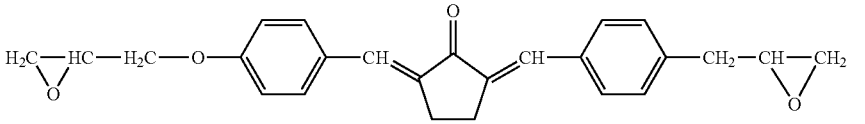 | A. B. Samui, 2007 |

In another embodiment, the curing agents are an ionic photo initiator and a photo sensitizer. More preferably, the curing agents are diaryliodonium salts, triaryliodonium salts and ferrocenium salts. And most preferably, the diaryliodonium salt is (4-octylphenyl) phenyliodonium hexafluoroantimonate (OPIA).

In another preferred embodiment, the wavelength for the absorption spectrum of photo sensitizer is in the range of visible light.

In another preferred embodiment, the weight percentage of the photo initiator, photo sensitizer and epoxy resin is 0.01~0.1:0.02~0.1:1.

In another preferred embodiment, the curing agent includes a hardener. And more preferably, the hardener is the aliphatic amines, ketimines, polyetheramines, cycloaliphatic amines, aromatic amines, arylyl amines, polyamides, amidoamines, dicyandiamide, phthalic anhydride (PA), tetrahydrophthalic anhydride (THPA), methyltetrahydrophthalic anhydride (MTHPA), methyl hexahydrophthalic anhydride (MHHPA), hexahydrophthalic anhydride (HHPA), nadic methyl anhydride or methyl himic anhydride (MHA), or benzophenonetetracarboxylic dianhydride (BTDA).

In another embodiment, the polymerization is a photo curing polymerization.

In another embodiment, the liquid crystalline epoxy nanocomposite is prepared as thin film or block.

In another embodiment, the liquid crystalline epoxy nanocomposite can be applied in direct or indirect clinical restoration, dental core-post system, and dental brace.

The various forming and curing ways in well-known polymer processing field or well-known dental filling process of dentist can be adopted for the liquid crystalline epoxy nanocomposite prepared by the method of the invention. For example, the dental focusing light source with more than 400 nm wavelength, such as the Optilux 401 Curing Light (US Kerr Company) can be used to irradiate the material for several seconds to several minutes to initiate the reaction. Or by various curing ways, such as heating and pressurizing, chemical curing can be used to finish the polymerization of the material to form the thin film or block with required shape, which can be applied to direct or indirect restoration, dental core-post system, and dental brace.

The liquid crystalline epoxy nanocomposite material manufactured in accordance with the method of the invention has high wear resistance, microhardness, and color stability. It can satisfy the aesthetics and high strength required by dental therapy. Especially, it is not the stainless steel material.

It will not cause the allergy. It owns very good biological compatibility and it can be applied to all dental fields, such as the followings:

Direct and Indirect Restoration:

The dual cure of visible light cure or photo cure and chemical cure or thermal cure can be used for the nanocomposite prepared by the invention, in order to be applied in direct or indirect restoration. The liquid crystalline epoxy nanocomposite prepared in accordance with the method of the invention can be applied in the dental adhesion, casting, filling, coating, and restoration etc. It can be prepared outside the mouth in advance, then it is placed in the mouth and irradiated by the visible light for direct restoration, or it can be cured outside the mouth, then it is placed in the mouth for indirect restoration.

Dental Core-Post System:

The dual cure of visible light cure or photo cure and chemical cure or thermal cure can be used for the nanocomposite prepared by the invention, in order to be applied in the dental core-post system. The liquid crystalline epoxy nanocomposite prepared in accordance with the method of the invention has closer natural teeth color, and elastic coefficient. So, it can be used to replace the traditional metal dental core-post system. The chemical cure is used to make the core from the liquid crystalline epoxy nanocomposite, and the hard stem structure of liquid crystalline polymer is introduced into the substrate of epoxy resin to form the post by the thermal cure, to get a good integrity. Meantime, the method of the invention can reduce the consumption of fiberglass and other reinforced materials, so, the production cost can be reduced effectively.

In the field of orthodontics, the liquid crystalline epoxy nanocomposite with high wear resistance, microhardness, and color stability can be used to make the dental brace. The invention uses the epoxy resin as the base material. It not only has good processing property and gloss, but also has lower shrinkage than the acrylic resin. The hardness and wear resistance can be raised to make the dental brace with lower deformation, excellent physical property, and natural teeth color.

The liquid crystalline epoxy nanocomposite material manufactured in accordance with the method of the invention can be cured by the photo cure, chemical cure, or thermal cure with various curing agents. The liquid crystalline epoxy nanocomposite can be applied in direct or indirect clinical restoration, dental core-post system, and dental brace. So, it can solve the shrinkage and deformation problem of polymer effectively, and provide excellent physical property, strength, microhardness and wear resistance. It has the characteristics of aesthetics and high strength required by dental therapy.

DESCRIPTION OF THE PREFERRED EMBODIMENT

The liquid crystalline epoxy nanocomposite material provided by the invention and the application can be fully understood by the following embodiments. It can be finished by the person with common knowledge in the technical field, but the implementation of the invention will not be limited by the following embodiments.

The method for manufacturing the liquid crystalline epoxy nanocomposite material of the invention mainly consists of four steps:

Step 1: The selection, preparation, modification and dispersion of the inorganic oxide nanoparticle;

Step 2: Mixing the liquid crystalline epoxy and the liquefied epoxy;

Step 3: Mixing the inorganic oxide nanoparticle and the epoxy solution; and,

Step 4: Carrying out the polymerization to synthesize the nanocomposite material.

Furthermore, the above four steps will be described as the followings.

About Step 1, the selection, preparation, modification and dispersion of the inorganic oxide nanoparticle:

In the step of preparing the inorganic oxide nanoparticle, the inorganic filler includes the spherical, club-shape, flaky and long fiber reinforced material, or the material with special function, such as fluorine ion releasing material. The size lies between several nanometers to several dozen microns, and its aspect ratio lies between 1 and $1 \times 10^3$. The spherical inorganic filler can be the zinc oxide, silicon dioxide, aluminum oxide, titanium dioxide, zirconium dioxide, and nano-gold etc. The club-shape inorganic filler can be the zinc oxide, silicon dioxide, aluminum oxide, and titanium dioxide etc. The flaky inorganic filler can be the flaky silicate such as clay and mica, and boron nitrogen or aluminum hydroxide etc. In addition, the layered double hydroxide, layered alumino phosphate, and other flaky metal phosphate can also be used to reinforce the liquid crystalline epoxy resin.

The chemical composition of inorganic oxide nanoparticle is MOx, where M is an inorganic element or a mixture of inorganic element. And more preferably, the inorganic element is silicon, and zirconium etc. The x value is determined by the ionic valence of element. The average particle size is smaller than 500 nm, which can be made by the sol-gel method from metal alkoxide such as $Si(OC_2H_5)_4$ etc. There are several commercial products, and the preferable ones are MA-ST-M Colloid Silica (Nissan Chemical Co.), and IPA-ST-M Colloid Silica (Nissan Chemical Co.). The surface of inorganic oxide nanoparticle can be modified organically to improve its dispersion condition and stability in the epoxy, or increase the interaction force between the inorganic oxide nanoparticle and the epoxy resin. The silane compound containing the organic group can be used for the organic modification. The general formula of the silane compound is $(Y-R)nSiXm$, where n=1, 2 or 3, n+m≦4, and Y is the epoxy group which can react with the epoxy group, the phenyl group, methyl group; R is linear alkyl group, which can connect Y group and Si, the preferable one is more than 5 carbon atoms; and X is a group which can be hydrolyzed into Si—OH, such as the alkyl oxygen group, and fluorine etc. And more preferably, the silane compound is diphenyldimethoxysilane or γ-glycidoxypropyltrimethoxysilane (Z-6040, Dow Corning). After the silane is hydrolyzed by acid or alkaline as catalyst at medium temperature such as 40° C. to 80° C. it is mixed and agitated with the inorganic oxide particle for more than 10 hours, and then the solution containing the modified inorganic oxide particle will be formed.

Except the inorganic oxide particle is modified by the silane coupling agent, the inorganic filler can be dispersed by the surfactant or polymer dispersant. The surfactant includes the cationic, anionic, and neutral surfactant, wherein the neutral surfactant with polyethylene glycol (PEG) chain section has the best effect. The applicable polymer dispersant includes the ethylene glycol, polyvinyl alcohol (PVA), polyvinyl acetate (PVAc), and polyvinyl butyral (PVB) etc.

About step 2, mixing the liquid crystalline epoxy resin and the liquefied epoxy resin:

After mixing the liquid crystalline epoxy resin and the liquefied epoxy resin at a fixed ratio, it is heated to dissolve the liquid crystalline epoxy in the liquefied epoxy, in order to obtain the epoxy solution with suitable processing property. The applicable liquefied epoxies include the bis-phenol A epoxies, cycloaliphatic epoxies or other glycidyl ether, wherein the 3,4-epoxycyclohexane methyl-3,4-epoxycyclohexane carboxylate (ERL-4221, Union Carbide) or 4-vinyl cyclohexane dioxide (ERL-4206, Union Carbide) has better reaction and dilution effect.

About Step 3, mixing the inorganic oxide nanoparticle and the epoxy solution:

The epoxy solution obtained from Step 2 is mixed with the inorganic oxide nanoparticle and the curing agent. If the photo curing process is adopted for the polymerization, the selection of ionic photo initiator depends on different epoxy monomer, comprising the diaryliodonium salts, triaryliodonium salts and ferrocenium salts etc., wherein the preferable ones are the diaryliodonium salts, such as the (4-octylphenyl) phenyliodonium hexafluoro antimonate (OPIA, General Electric Co.). The wavelength for the absorption spectrum of photo sensitizer shall be in the range of visible light, which shall be between 400 to 600 nm preferably. The quantum throughput will be significant in this range. The preferred photo sensitizer is the camphorquinone. The above photo initiator and photo sensitizer should be able to be dissolved in the epoxy monomer, and the preferred weight percentage is:

photo initiator: photo sensitizer: epoxy monomer=0.01~0.1:0.02~0.1:1

After these three ingredients are mixed with the inorganic oxide particle obtained from Step 1 evenly, remove the solvents such as water, alcohol etc. under light shielding environment at 40° C.~60° C. After the bulk weight in not changed again, the epoxy nanocomposite is formed and ready for photo polymerization.

Except the photo sensitizer, common epoxy curing agent also can be added for hot polymerization. The curing agent comprises the above-mentioned OPIA and other hardeners, such as the aliphatic amines, ketimines, polyetheramines, cycloaliphatic amines, aromatic amines, arylyl amines, polyamides, amidoamines, dicyandiamide, phthalic anhydride (PA), tetrahydrophthalic anhydride (THPA), methyltetrahydrophthalic anhydride (MTHPA), methyl hexahydrophthalic anhydride (MHHPA), hexahydrophthalic anhydride (HHPA), nadic methyl anhydride or methyl himic anhydride (MHA), and benzophenonetetracarboxylic dianhydride (BTDA).

About Step 4, carrying out the polymerization to synthesize the nanocomposite material:

The various forming and curing ways in well-known polymer processing field or well-known dental filling process of dentist can be adopted for the liquid crystalline epoxy nanocomposite prepared by Step 3. For example, the dental focusing light source with more than 400 nm wavelength, such as the Optilux 401 Curing Light (US Kerr Company) can be used to irradiate the material for several seconds to several minutes to initiate the reaction. Or various curing ways, such as heating and pressurizing, chemical curing can be used to finish the polymerization of the material to form the thin film or block with required shape, which can be applied in direct or indirect restoration, dental core-post system, and dental brace.

The liquid crystalline epoxy nanocomposite material manufactured by the method of the invention owns the following characteristics:

1. Microhardness
   A. After testing in the laboratory, it is found the microhardness of the dental brace (Spirit MB (Ormco Co.)) made by the existing commercial polycarbonate is about 8.33~8.42 Hv. In addition, the microhardness of the dental brace (Rave (Ortho Anderson Co.)) made by commercial resin is about 9.48 Hv before thermocycling (55° C./5° C., 6000 times) and about 6.71 Hv after thermocycling. It shows that the existing material is more unstable.
   B. The liquid crystalline epoxy nanocomposite prepared by the method of the invention can be applied in all clinical dental therapy fields, including direct or indirect clinical restoration, dental core-post system, and dental brace etc. After treated by suitable process, higher hardness can be achieved, and its excellent stable physical property can be kept after thermocycling.
2. Wear Resistance
   A. After the wear test, it is found that the existing commercial polycarbonate becomes very rough and easy to be damaged and deformed.
   B. After the microscratch test, it is found that the liquid crystalline epoxy nanocomposite prepared by the invention has higher cracking strength, which can be applied in direct or indirect clinical restoration, dental core-post system, and dental brace.
3. Color Stability
   The liquid crystalline epoxy nanocomposite prepared by the method of the invention has very stable color against the discoloration.

Summarized from the above-mentioned description, the liquid crystalline epoxy nanocomposite material manufactured by the method of the invention owns the advantages of high transparency, stable color, nearly teeth color, aesthetics, wear resistance, high hardness, cracking stability etc., which can be applied to direct or indirect clinical restoration, dental core-post system, and dental brace etc.

In addition, the liquid crystalline epoxy nanocomposite prepared by the method of the invention is not stainless steel, which owns excellent biological compatibility with tissue allergen. The liquid crystalline epoxy nanocomposite provided by the invention has very good adhesion with teeth structure, which can be applied in direct or indirect clinical restoration, dental core-post system, and dental brace etc.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for manufacturing a liquid crystalline epoxy nanocomposite material for dental therapy, comprising:
   providing an inorganic oxide nanoparticle filler component, wherein the inorganic oxide nanoparticles are surface modified by a silane coupling agent or a dispersant, and wherein the inorganic oxide nanoparticle filler component comprises one or more oxides of silicon, aluminum, titanium, gold, zinc and zirconium;
   mixing a liquid crystalline epoxy resin and a liquefied epoxy resin, wherein the liquid crystalline epoxy resin has a biphenyl group containing structure or an azomethine group containing structure, and wherein the liquefied epoxy resin is selected from the group consisting of 3,4-epoxycyclohexane methyl-3,4-epoxycyclohexane carboxylate and 4-vinyl cyclohexane dioxide;
   heating the resulting mixture to dissolve the liquid crystalline epoxy resin in the liquefied epoxy resin, forming an epoxy solution;

mixing the epoxy solution, the inorganic oxide nanoparticle filler component and a curing agent, wherein the curing agent comprises an ionic photo initiator selected from the group consisting of diaryliodonium salts, triaryliodonium salts and ferrocenium salts; and photo curing the resulting mixture to form the liquid crystalline epoxy nanocomposite material.

2. The method according to claim 1, wherein the dispersant is selected from the group consisting of a surfactant and a polymer dispersant.

3. The method according to claim 1, wherein the silane coupling agent is selected from the group consisting of diphenyldimethoxysilane and γ-glycidoxypropyltrimethoxysilane.

4. The method according to claim 1, wherein the curing agent further comprises a hardener selected from the group consisting of aliphatic amines, ketimines, polyetheramines, cycloaliphatic amines, aromatic amines, arylyl amines, polyamides, amidoamines, dicyandiamide, phthalic anhydride (PA), tetrahydrophthalic anhydride (THPA), methyltetrahydrophthalic anhydride (MTHPA), methyl hexahydrophthalic anhydride (MHHPA), hexahydrophthalic anhydride (HHPA), nadic methyl anhydride, methyl himic anhydride (MHA), and benzophenone tetracarboxylic dianhydride (BTDA).

5. The method according to claim 1 wherein the ionic photo initiator comprises (4-octylphenyl)phenyliodonium hexafluoroantimonate (OPIA).

* * * * *